(12) United States Patent
Roh

(10) Patent No.: US 7,009,838 B2
(45) Date of Patent: Mar. 7, 2006

(54) COMPUTER DISK DRIVE ADAPTER

(75) Inventor: Su-hyeon Roh, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 10/602,695

(22) Filed: Jun. 25, 2003

(65) Prior Publication Data
US 2004/0114321 A1 Jun. 17, 2004

(30) Foreign Application Priority Data
Dec. 11, 2002 (KR) ...................... 10-2002-0078775

(51) Int. Cl.
G06F 1/16 (2006.01)
H05K 5/00 (2006.01)
(52) U.S. Cl. .................................. 361/685; 312/223.1
(58) Field of Classification Search ........ 361/683–685, 361/728–731; 369/75.11, 78; 248/633, 248/634, 636–638; 312/223.1, 223.2
See application file for complete search history.

(56) References Cited

U.S. PATENT DOCUMENTS

| 5,491,608 | A | * | 2/1996 | Koyanagi et al. ........... 361/685 |
| 5,668,697 | A | * | 9/1997 | Dowdy ....................... 361/685 |
| 5,822,152 | A | * | 10/1998 | Seaver et al. ............ 360/99.08 |
| 5,886,869 | A | | 3/1999 | Fussell et al. |
| 6,249,432 | B1 | * | 6/2001 | Gamble et al. ............. 361/685 |
| 6,487,081 | B1 | * | 11/2002 | Homer et al. ............... 361/730 |
| 6,810,451 | B1 | * | 10/2004 | Sasaki ......................... 710/74 |
| 2003/0002270 | A1 | * | 1/2003 | Kitadai ....................... 361/807 |

FOREIGN PATENT DOCUMENTS

| CN | 407744 | 10/1989 |
| JP | 63-46682 | 2/1988 |
| JP | 4-108219 | 9/1992 |
| JP | 5-313787 | 11/1993 |
| JP | 6-75661 | 3/1994 |
| JP | 7-36562 | 2/1995 |
| JP | 9-81266 | 3/1997 |
| JP | 11-242881 | 9/1999 |
| KR | 1998-068411 | 12/1998 |
| KR | 1999-011064 | 2/1999 |

* cited by examiner

Primary Examiner—Lynn Feild
Assistant Examiner—Anthony Q. Edwards
(74) Attorney, Agent, or Firm—Staas & Halsey LLP

(57) ABSTRACT

A computer provided with a computer body having a mounting receptacle in which a first hard disk drive (HDD) is detachably accommodated. The computer includes an HDD adapter that fits into the mounting receptacle instead of the first HDD. A second HDD smaller than the first HDD is detachably accommodated in the HDD adapter. Thus, the computer allows HDDs having different sizes to be selectively mounted thereon. Accordingly, a worker in a production line can easily mount the second HDD that is smaller than the first HDD on a mounting receptacle adapted for the first HDD by using the HDD adapter. A user of the computer can also easily exchange the first HDD for the second HDD by using the HDD adapter.

16 Claims, 5 Drawing Sheets

COMPUTER DISK DRIVE ADAPTER

CROSS-REFERENCE TO RELATED APPLICATIONS

This application claims the benefit of Korean Patent Application No. 2002-78775, filed Dec. 11, 2002, in the Korean Intellectual Property Office, the disclosure of which is incorporated herein by reference.

BACKGROUND OF THE INVENTION

1. Field of the Invention

The present invention relates to a computer, such as a portable computer, and, more particularly, to a computer in which hard disk drives having different sizes can be installed selectively and conveniently.

2. Description of the Related Art

Computers have devices, such as a hard disk drive (HDD), a CD ROM drive, and a floppy disk drive (FDD), that are detachably installed in the computer body and are conveniently detached from the computer body.

As disclosed in Korean Patent First Publication No. 1999-11064, to insert an HDD with a predetermined size into the computer body, a mounting receptacle having a size corresponding to the size of the HDD is formed in the computer body.

A conventional computer with the above configuration has the following problems.

First, the mounting receptacle of the conventional computer is formed to correspond to an HDD having a predetermined size. Thus, when an assembly worker installs the HDD in the mounting receptacle, if the HDD is smaller than the mounting receptacle, then the worker is unable to install the smaller HDD and the assembly process is interrupted. That is, there is a problem in that the HDD that is smaller than the mounting receptacle cannot be installed in the mounting receptacle.

Second, a user of the conventional computer with an existing HDD is unable to replace the existing HDD with a smaller HDD because the mounting receptacle is sized only for the existing HDD.

Thus, there is a need to provide a computer in which hard disk drives having different sizes can be easily and conveniently installed.

SUMMARY OF THE INVENTION

Accordingly, it is an aspect of the present invention to provide a computer in which hard disk drives having different sizes can be installed selectively and conveniently.

Additional aspects and advantages of the present invention will be set forth in part in the description that follows and, in part, will be obvious from the description, or may be learned by practice of the invention.

To achieve the above and/or other aspects of the present invention, there is provided a computer, including a computer body having a mounting receptacle in which a first hard disk drive is detachably accommodated; and detachably accommodating a second hard disk drive smaller than the first hard disk drive, and the mounting receptacle receiving the hard disk drive adapter instead of the first hard disk drive when the second hard disk drive is to be installed in the computer.

The hard disk drive adapter includes a supporting frame into which the second hard disk drive is placed; hooks provided in respective corners of the supporting frame onto which the second hard disk drive is hung; and extension parts extended outward from the respective corners of the supporting frame corresponding to each of the hooks.

The mounting receptacle is formed as a cavity in an underside of the computer body.

The computer further includes a door detachably attached to the computer body to open and close the mounting receptacle.

A plurality of rubber members adhere to an inner circumference of the mounting receptacle.

The first hard disk drive is a 2.5-inch hard disk drive, and the second hard disk drive is a 1.8-inch hard disk drive.

To achieve the above and/or other aspects according to the present invention, there is provided a hard disk drive adapter for a computer having a hard disk drive mounting receptacle to detachably accommodate a first hard disk drive, the hard disk drive adapter including a supporting frame into which a second hard disk drive smaller than the first hard disk drive is placed; hooks provided in respective corners of the supporting frame that hold onto the second hard disk drive when the hard disk drive adapter is turned over for insertion into the mounting receptacle; and extension parts extending outward from the respective corners of the supporting frame to fit the hard disk drive adapter into the mounting receptacle.

To achieve the above and/or other aspects according to the present invention, there is provided a method of using a hard disk drive adapter to replace a first hard disk drive with a smaller second hard disk drive in a computer having a hard disk drive mounting receptacle that detachably accommodates the first hard disk drive, the hard disk drive adapter having a supporting frame, hooks in respective corners of the supporting frame, and extension parts extending from the respective corners of the supporting frame, the method including removing the first hard disk drive from the mounting receptacle; placing the second hard disk drive in the hard disk drive adapter by inserting the second hard disk drive into the supporting frame under the hooks, and turning over the hard disk drive adapter, the second hard disk drive hanging from the hooks when the hard disk drive adapter is turned over; and placing the hard disk drive adapter into the mounting receptacle, the extension parts fitting the hard disk drive adapter into the mounting receptacle.

These and/or other aspects and advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and/or advantages of the present invention will become apparent and more readily appreciated from the following description of the embodiment, taken in conjunction with the accompany drawings, of which.

DETAILED DESCRIPTION OF THE PREFERRED EMBODIMENT

Figure 1:
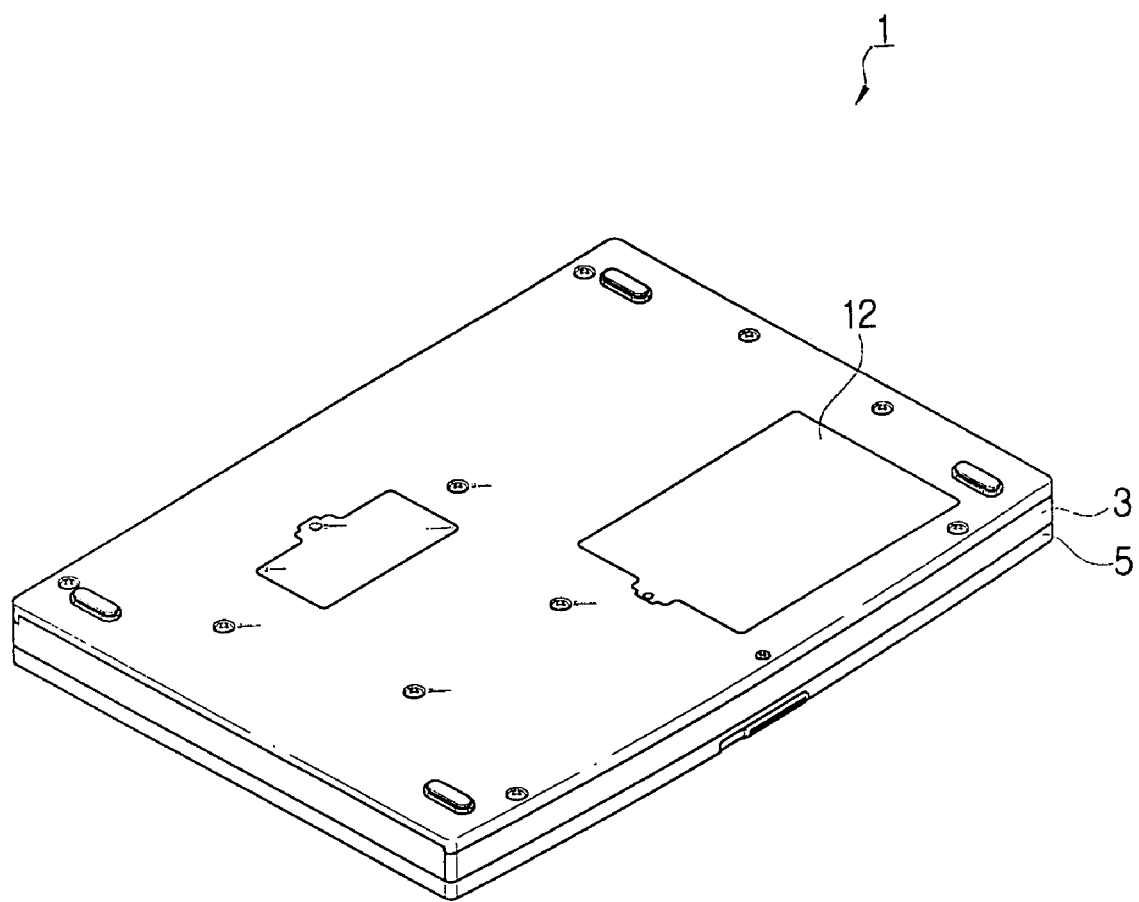
FIG. 1 is a view illustrating an underside of a computer according to an embodiment of the present invention.

Hereinafter, embodiments of the present invention will be described in detail with reference to the attached drawings, wherein the like reference numerals refer to the like elements throughout. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 2:
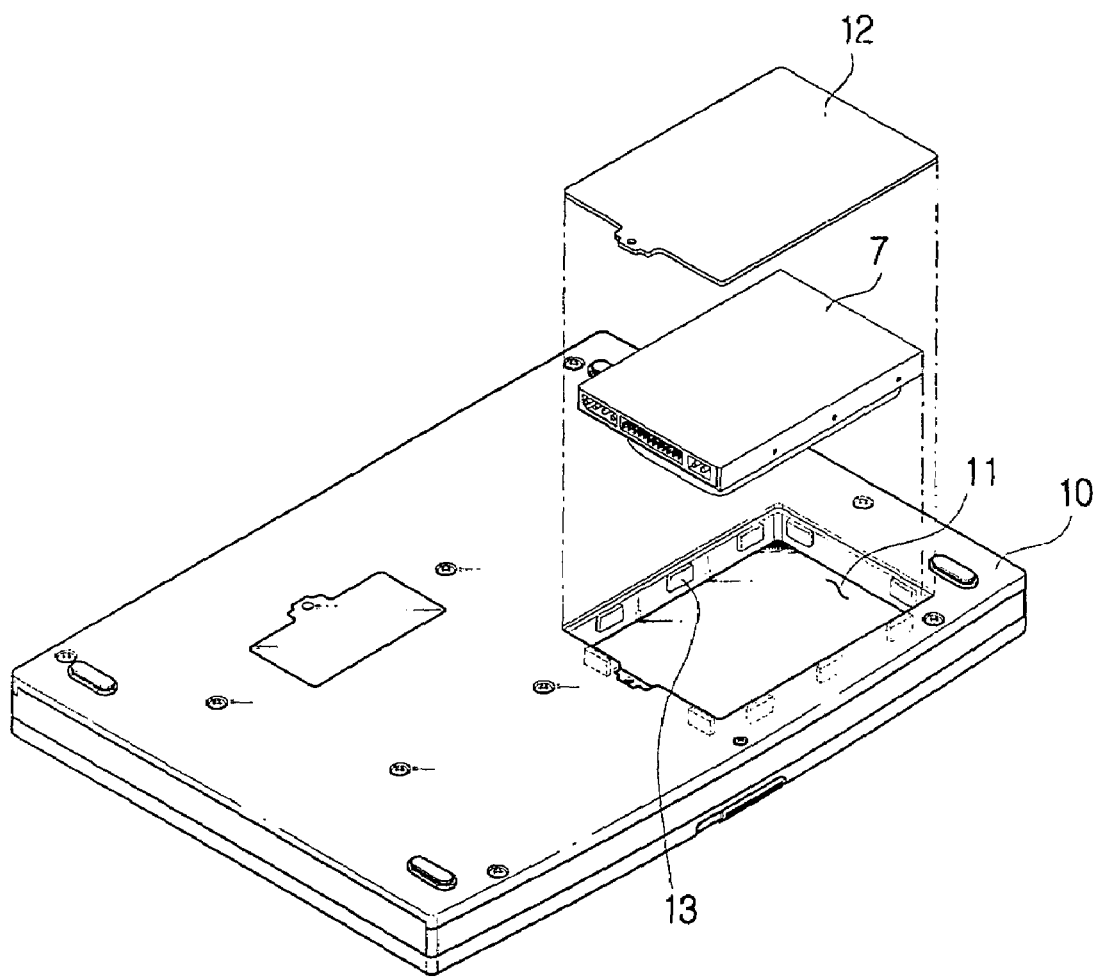
FIG. 2 is an exploded view illustrating an installation region for a first HDD of the computer of FIG. 1.

As shown in FIGS. 1 and 2, a computer 1 according to the embodiment of the present invention, comprises a computer body 3 having an input device (not shown), and a mother board (not shown) with a CPU and a graphic chip, a displaying part 5 rotatably attached to the computer body 3 for displaying information according to a user's manipulations.

The computer body 3 includes an external casing 10. The motherboard (not shown) is provided in the casing 10 and houses the CPU and the graphic chip. The computer body 3 also has a plurality of hardware including input and output devices (not shown).

The underside of the casing 10 includes a mounting receptacle 11 accommodating, for example, a 2.5-inch HDD 7. The mounting receptacle 11 is opened and closed by a door 12, which is detachable relative to the casing 10.

The mounting receptacle 11 is formed within the casing 10 and sized to receive the 2.5-inch HDD 7.

Along an inner circumference of the mounting receptacle 11 is a plurality of rubber members 13. The rubber members 13 are interposed between the inner circumference of the mounting receptacle 11 and the 2.5-inch HDD 7. The rubber members 13, prevent the 2.5-inch HDD 7 from moving and operate as shock absorbers for the 2.5-inch HDD 7.

Figure 3:
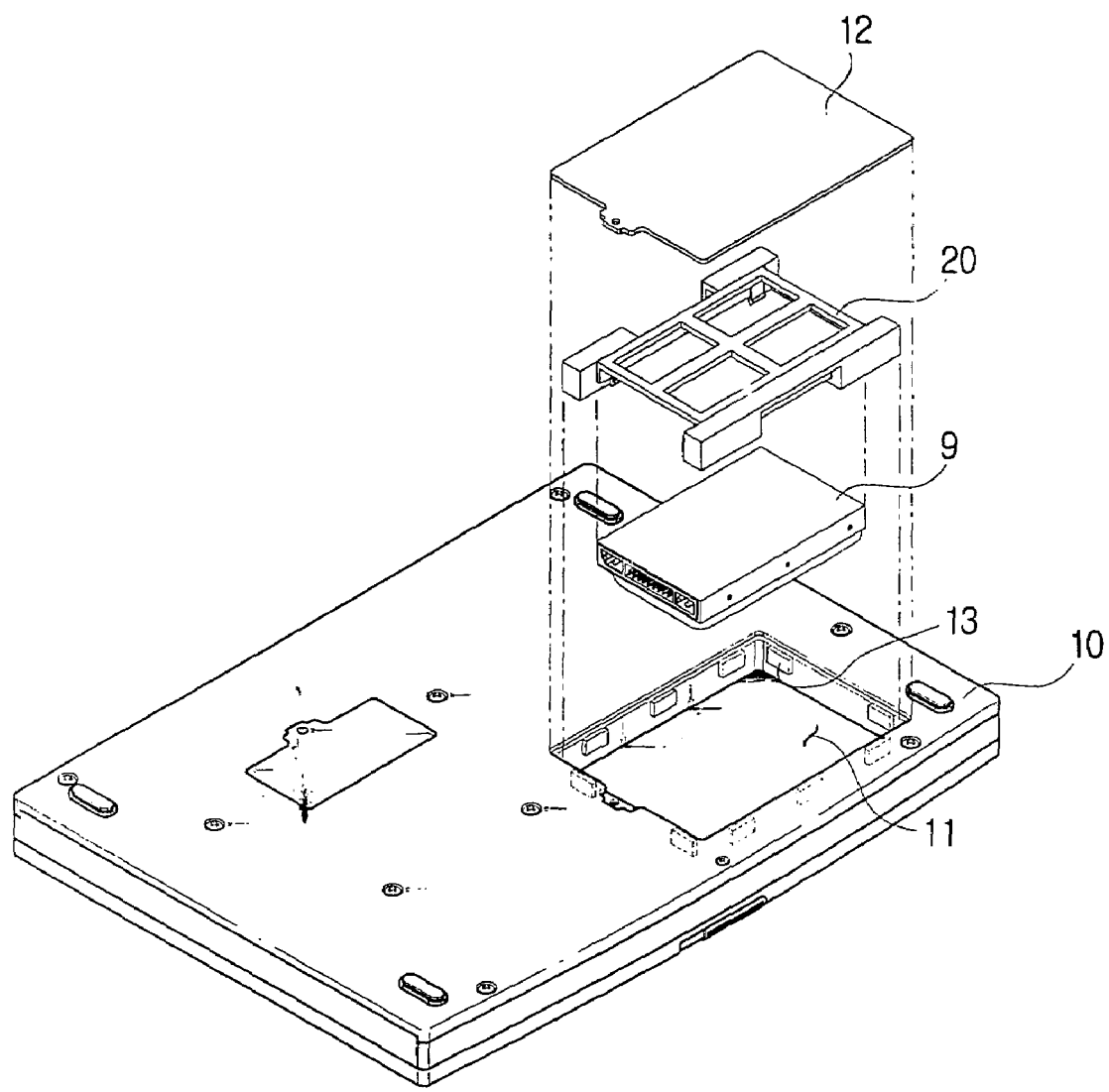
FIG. 3 is an exploded view illustrating an HDD adapter and installation of a second HDD smaller than the first HDD in the installation region of the first HDD of the computer of FIG. 2.
Figure 4:
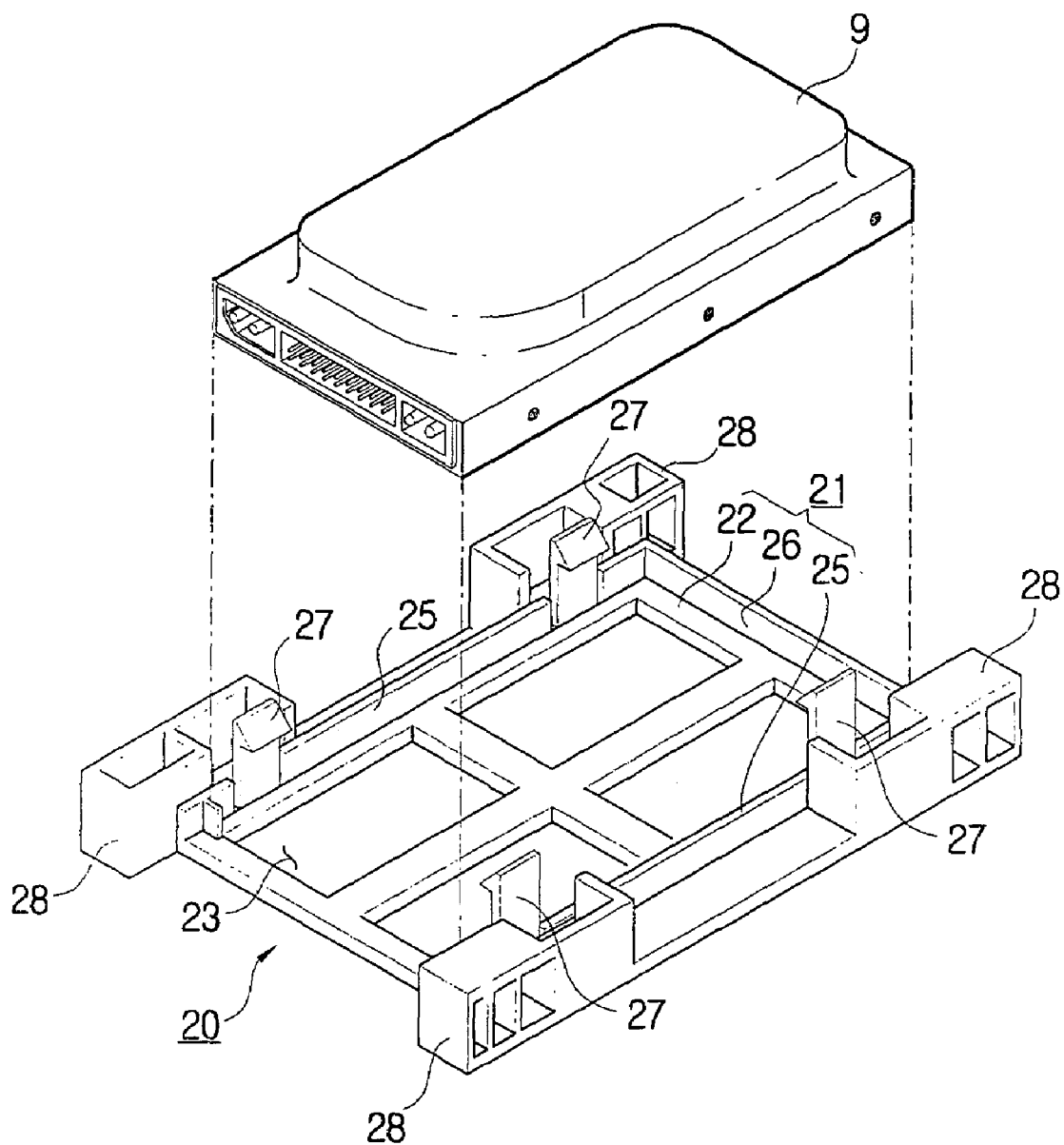
FIG. 4 is an exploded view illustrating the second HDD and the HDD adapter of FIG. 3.

If a user exchanges the 2.5-inch HDD 7 for a 1.8-inch HDD 9, for example, the user removes the 2.5-inch HDD 7 from the mounting receptacle 11 and inserts an HDD adapter 20 housing the 1.8-inch HDD 9 into the mounting receptacle 11 (described below with reference to FIGS. 3 though 5).

The HDD adapter 20 fits into the mounting receptacle 11, which is the sized to receive the 2.5-inch HDD 7. The HDD adapter 20 includes a supporting frame 21 into which the 1.8-inch HDD 9 fits, hooks 27 which hold onto the 1.8-inch HDD 9 when the HDD adapter 20 is turned over for insertion into the mounting receptacle 11, and extension parts 28 that extend outward from the respective corners of the supporting frame corresponding to the respective hooks 27.

The supporting frame 21 has a box shape with its upper side open, and is sized to receive the 1.8-inch HDD 9. Further, the supporting frame 21 has a bottom part 22 onto which the 1.8-inch HDD 9 is mounted, and a sidewall extending upward from a circumference of the bottom part 22. Four openings 23 are formed in the bottom part 22. The sidewall has a pair of lengthwise sidewalls 25 and one widthwise sidewall 26.

Each hook 27 protrudes upward from the lengthwise sidewalls 25 and is disposed adjacent to each corner of the supporting frame 21. That is, a pair of hooks 27 are disposed in each lengthwise sidewall 25 a predetermined distance from each other so that the 1.8-inch HDD 9 can fit into the supporting frame 21 with the four hooks 27 disposed in the four corners of the 1.8-inch HDD 9. Both lateral edges of the 1.8-inch HDD 9 are hung onto the four hooks 27.

The extension parts 28 extend outward from the lengthwise sidewalls 25 and are disposed in positions corresponding to the respective hooks 27. Also, the extension parts 28 contact the surrounding sidewalls of the mounting receptacle 11. A pair of the extension parts 28 are disposed in each lengthwise sidewall 25 a predetermined distance from each other. Accordingly, the HDD adapter 20 is inserted into the mounting receptacle 11 with the four extension parts 28 respectively contacting the four corners of the mounting receptacle 11.

Replacement of the 2.5-inch HDD 7 installed in the mounting receptacle 11 of the computer body 3 with the 1.8-inch HDD 9 is described as follows.

Figure 5:
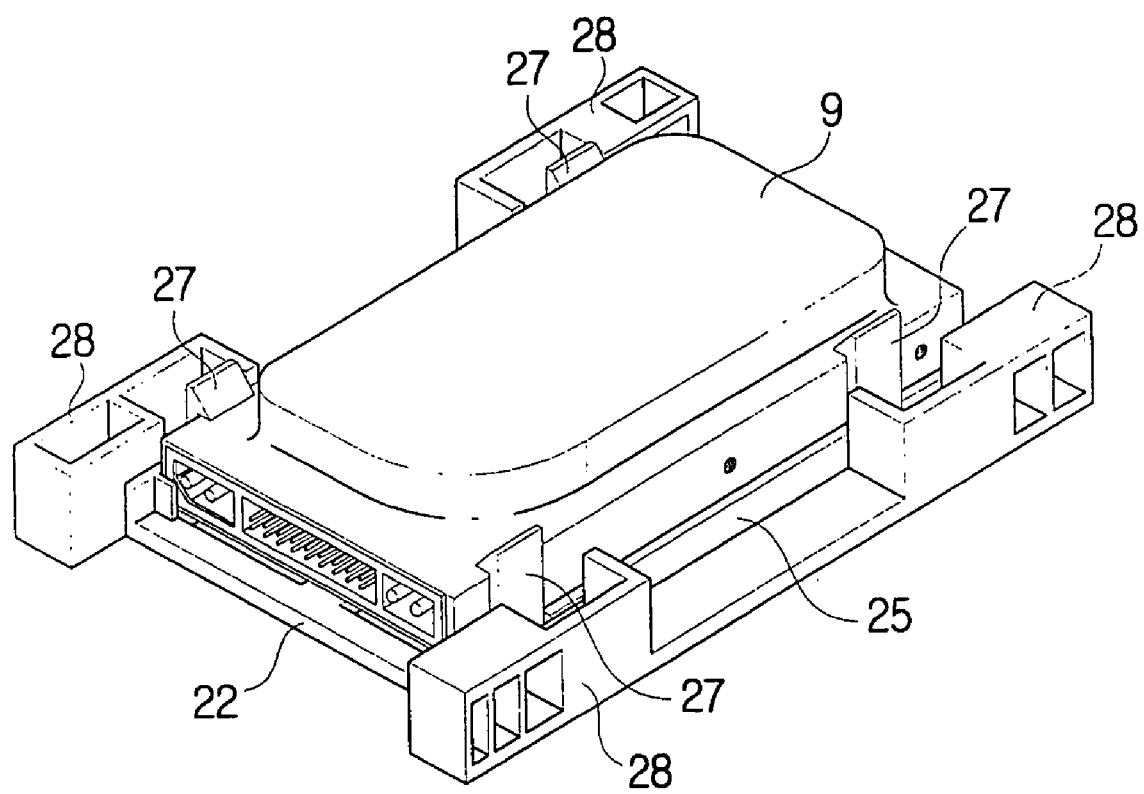
FIG. 5 is a perspective view illustrating engagement of the second HDD and the HDD adapter of FIG. 4.

First, as shown in FIG. 2, a user turns the computer body 3 upside down so that the underside of the casing 10 is exposed, opens the door 12 on the underside of the casing 10, and removes the 2.5-inch HDD 7 from the mounting receptacle 11. The user inserts the 1.8-inch HDD 9 into the HDD adapter 20. As shown in FIG. 5, the 1.8-inch HDD 9 is mounted on the bottom part 22 of the supporting frame 21 of the HDD adapter 20. Both of the lateral edges of the 1.8-inch HDD 9 are inserted under the four hooks 27 formed in the pair of lengthwise sidewalls 25. After the 1.8-inch HDD 9 is inserted into the HDD adapter 20, the HDD adapter 20 is turned over and mounted in the mounting receptacle 11. As shown in FIG. 3, the HDD adapter 20 is turned over and inserted into the mounting receptacle 11 with the hooks 27 pointing toward the mounting receptacle 11. The door 12 is placed over the HDD adapter 20 to close the mounting receptacle 11, completing assembly.

Thus, the computer 1 according to the present invention enables the 1.8-inch HDD 9 to fit into the mounting receptacle 11, from which the 2.5-inch HDD 7 is removed by using the HDD adapter 20, unlike a conventional computer, which only allows a 2.5-inch HDD to fit into a mounting receptacle adapted for a 2.5-inch HDD.

According to the present invention, a user can selectively exchange the 2.5-inch HDD 7 for the 1.8-inch HDD 9, or the 1.8-inch HDD 9 for the 2.5-inch HDD 7. Thus, a worker in a production line, as well as a user of the computer 1, can selectively install HDDs having different sizes.

When the production line worker installs the 1.8-inch HDD 9 in the computer body 3, even though the mounting receptacle 11 is adapted for the 2.5-inch HDD 7, the production line is not interrupted. Rather, the worker only needs to insert the 1.8-inch HDD 9 into the HDD adapter 20, and then mount the HDD adapter 20 containing the 1.8-inch HDD 9 in the mounting receptacle 11, which has been formed to correspond to the 2.5-inch HDD 7.

The method of assembling the HDD adapter 20 with the 1.8-inch HDD 9 is described as follows. The 1.8-inch HDD 9 is inserted into the HDD adapter 20. Both lateral edges of the 1.8-inch HDD 9 are inserted under the four hooks 27 formed in the pair of lengthwise sidewalls 25 as the 1.8-inch HDD 9 is mounted on the bottom part 22 of the supporting frame 21. Subsequently, as shown in FIG. 3, the HDD adapter 20 containing the 1.8-inch HDD 9 is turned over and fit into the mounting receptacle 11 with the hooks 27 pointing toward the mounting receptacle 11. Finally, the door 12 is placed over the mounting receptacle 11, completing assembly.

As described above, according to the present invention, a computer is provided that allows HDDs having different sizes to be selectively mounted thereon.

Accordingly, a worker in a production line can easily mount a second HDD, having a smaller size relative to a first HDD, in a mounting receptacle formed to correspond to the size of the first HDD by using an HDD adapter. A user of the computer can also easily exchange the first HDD for the second HDD by using the HDD adapter.

According to the above embodiment of the present invention, the first HDD is the 2.5-inch HDD 7 and the second HDD is the 1.8-inch HDD 9, but the sizes of the HDDs are not limited to 1.8 and 2.5-inches.

Although an embodiment of the present invention has been shown and described, it will be appreciated by those skilled in the art that changes may be made in this embodiment without departing from the principles and spirit of the invention, the scope of which is defined in the appended claims and their equivalents.

What is claimed is:

1. A computer, comprising:
  a computer body having a mounting receptacle in which a first hard disk drive is detachably accommodated; and
  a hard disk drive adapter detachably accommodating a second hard disk drive smaller than the first hard disk drive, and the mounting receptacle receiving the hard disk drive adapter instead of the first hard disk drive when the second hard disk drive is to be installed in the computer, wherein the hard disk drive adapter comprises:
    a supporting frame into which the second hard disk drive is placed, wherein the supporting frame has a bottom part;
    hooks provided adjacent to respective corners of the supporting frame onto which the second hard disk drive is hung; and
    extension parts extended outward from the respective corners of the supporting frame corresponding to each of the hooks and the extension parts extended outside of the bottom part of the supporting frame to fit the hard disk drive adapter into the mounting receptacle.

2. The computer according to claim 1, wherein the mounting receptacle is formed as a cavity in an underside of the computer body.

3. The computer according to claim 2, further comprising a door detachably attached to the computer body to open and close the mounting receptacle.

4. The computer according to claim 1, further comprising a plurality of rubber members adhering to an inner circumference of the mounting receptacle.

5. The computer according to claim 1, wherein the first hard disk drive is a 2.5-inch hard disk drive, and the second hard disk drive is a 1.8-inch hard disk drive.

6. The computer according to claim 1, wherein the mounting receptacle is adapted to the first hard disk drive, and the hard disk drive adapter is adapted to the second hard disk drive.

7. The hard disk drive adapter according to claim 1, wherein the supporting frame has a rectangular shape and further comprises:
  a widthwise sidewall extending upward from one side of the bottom part; and
  lengthwise sidewalls extending upward from each side of the bottom part adjacent to the widthwise sidewall.

8. The hard disk drive adapter according to claim 1, wherein the second hard disk drive is mounted to the bottom part.

9. A hard disk drive adapter for a computer having a hard disk drive mounting receptacle to detachably accommodate a first hard disk drive, the hard disk drive adapter comprising:
  a supporting frame into which a second hard disk drive smaller than the first hard disk drive is placed, wherein the supporting frame has a bottom part;
  hooks provided adjacent to respective corners of the supporting frame that hold onto the second hard disk drive when the hard disk drive adapter is turned over for insertion into the mounting receptacle; and
  extension parts extending outward from the respective corners of the supporting frame and outside of the bottom part of the supporting frame to fit the hard disk drive adapter into the mounting receptacle.

10. The hard disk drive adapter according to claim 9, wherein the mounting receptacle is adapted to the first hard disk drive, and the hard disk drive adapter is adapted to the second hard disk drive.

11. The hard disk drive adapter according to claim 9, wherein the supporting frame has a rectangular shape and further comprises:
  a widthwise sidewall extending upward from one side of the bottom part; and
  lengthwise sidewalls extending upward from each side of the bottom part adjacent to the widthwise sidewall.

12. The hard disk drive adapter according to claim 11, wherein each hook extends upward from the lengthwise sidewalls and the extension parts extend outward from the lengthwise sidewalls.

13. The hard disk drive adapter according to claim 12, wherein the extension parts contact sidewalls of the mounting receptacle.

14. The hard disk drive adapter according to claim 9, wherein the second hard disk drive is mounted to the bottom part.

15. A method of using a hard disk drive adapter to replace a first hard disk drive with a smaller second hard disk drive in a computer having a hard disk drive mounting receptacle that detachably accommodates the first hard disk drive, the hard disk drive adapter having a supporting frame, hooks adjacent to respective corners of the supporting frame, and extension parts extending outward from the respective corners of the supporting frame having a bottom part, wherein the extension parts are extended outside of the bottom part, the method comprising:
  removing the first hard disk drive from the mounting receptacle;
  placing the second hard disk drive in the hard disk drive adapter by
    inserting the second hard disk drive into the supporting frame under the hooks, and
    turning over the hard disk drive adapter, the second hard disk drive hanging from the hooks when the hard disk drive adapter is turned over; and
  placing the hard disk drive adapter into the mounting receptacle, the extension parts fitting the hard disk drive adapter into the mounting receptacle.

16. The hard disk drive adapter according to claim 15, wherein the supporting frame further comprises:
  a widthwise sidewall extending upward from one side of the bottom part; and
  lengthwise sidewalls extending upward from each side of the bottom part adjacent to the widthwise sidewall.

* * * * *